(12) United States Patent
Sakawaki et al.

(10) Patent No.: US 6,844,046 B2
(45) Date of Patent: Jan. 18, 2005

(54) MAGNETIC RECORDING MEDIUM, PRODUCTION PROCESS THEREOF, MAGNETIC RECORDING AND REPRODUCING APPARATUS, AND SPUTTERING TARGET

(75) Inventors: Akira Sakawaki, Chiba (JP); Masato Kokubu, Chiba (JP); Ryuji Sakaguchi, Chiba (JP); Hiroshi Sakai, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 4 days.

(21) Appl. No.: 10/405,932
(22) Filed: Apr. 3, 2003
(65) Prior Publication Data
US 2003/0199680 A1 Oct. 23, 2003
US 2004/0230049 A9 Oct. 23, 2003

Related U.S. Application Data

(62) Division of application No. 09/810,193, filed on Mar. 19, 2001, now Pat. No. 6,582,758.
(60) Provisional application No. 60/230,810, filed on Sep. 7, 2000.

(30) Foreign Application Priority Data
Mar. 17, 2000 (JP) ....................... P2000-077034

(51) Int. Cl.[7] .............................. G11B 5/738
(52) U.S. Cl. ............ 428/65.3; 428/141; 428/336; 428/680; 428/694.75; 428/694 SG
(58) Field of Search ............... 428/65.3, 141, 428/336, 680, 694 TS, 694 SG

(56) References Cited

U.S. PATENT DOCUMENTS

| 5,314,745 A | | 5/1994 | Okumura | |
|---|---|---|---|---|
| 5,480,733 A | * | 1/1996 | Okumura et al. | 428/694 T |
| 6,248,395 B1 | * | 6/2001 | Homola et al. | 427/129 |
| 6,569,545 B1 | * | 5/2003 | Kanbe et al. | 428/694 T |
| 6,596,420 B2 | * | 7/2003 | Kanbe et al. | 428/694 TS |

FOREIGN PATENT DOCUMENTS

| JP | 05-197941 A | 8/1993 |
|---|---|---|
| JP | 09-167337 A | 6/1997 |

* cited by examiner

Primary Examiner—Stevan A. Resan
(74) Attorney, Agent, or Firm—Sughrue Mion, PLLC

(57) ABSTRACT

An object of the present invention is to provide a process for easily producing a magnetic recording medium exhibiting excellent magnetic characteristics. In the present invention, an orientation-determining film is formed on a non-metallic substrate which has undergone texturing, the orientation-determining film is subjected to oxidation or nitridation, and a non-magnetic undercoat film and a magnetic film are formed on the film.

10 Claims, 1 Drawing Sheet

MAGNETIC RECORDING MEDIUM, PRODUCTION PROCESS THEREOF, MAGNETIC RECORDING AND REPRODUCING APPARATUS, AND SPUTTERING TARGET

CROSS REFERENCE TO RELATED APPLICATIONS

This is a Divisional Application of application Ser. No. 09/810,193 filed Mar. 19, 2001 now U.S. Pat. No. 6,502,758, which claims benefit of Provisional Application No. 60/230,810 filed Sep. 7, 2000; the above noted prior applications are all hereby incorporated by reference.

FIELD OF THE INVENTION

The present invention relates to a magnetic recording medium employed in an apparatus such as a magnetic disk apparatus; a process for producing the magnetic recording medium; a sputtering target employed for producing the magnetic recording medium; and a magnetic recording and reproducing apparatus comprising the magnetic recording medium.

BACKGROUND OF THE INVENTION

Conventionally, a metallic substrate formed of, for example, an aluminum alloy is widely employed as a substrate for producing a magnetic recording medium. Usually, such a metallic substrate undergoes texturing, and is employed for producing a magnetic recording medium.

Texturing is a process for forming an irregular surface on a substrate along a predetermined direction (usually in a circumferential direction) of the substrate. When the surface of a substrate undergoes texturing, the crystalline orientation of an undercoat film and a magnetic film, which are formed on the substrate, is enhanced, and the magnetic film exhibits magnetic anisotropy. Thus magnetic characteristics, such as thermal stability and resolution, of a magnetic recording medium can be enhanced.

In recent years, instead of a metallic substrate formed of aluminum or similar metal, a non-metallic substrate formed of material such as glass or ceramic has been widely employed as a substrate for producing a magnetic recording medium. Such a non-metallic substrate has an advantage that head slap does not easily occur in the substrate, because of the high hardness of the substrate.

However, in the case in which a non-metallic substrate such as a glass substrate is employed, the magnetic film may not be imparted with satisfactory magnetic anisotropy even when the substrate undergoes texturing. As a result, the resultant magnetic recording medium may exhibit unsatisfactory magnetic characteristics.

In order to solve such problems, formation of a hard film which can be easily textured on a non-metallic substrate formed of material such as glass or ceramic has been proposed.

For example, Japanese Patent Application Laid-Open (kokai) No. 5-197941 discloses a magnetic recording medium including a non-metallic substrate formed of material such as glass or ceramic, and the substrate is coated through sputtering with NiP film serving as a hard film which is easily textured.

Japanese Patent Application Laid-Open (kokai) Nos. 4-29561 and 9-167337 disclose a magnetic recording medium including a non-metallic substrate which is plated with film such as electroless plating film, and the film serves as a hard film.

A magnetic recording medium including a hard film formed on a non-metallic substrate is produced through the following process: the hard film is formed on the substrate in a film formation apparatus such as a sputtering apparatus; the substrate is temporarily removed from the apparatus and is subjected to texturing by use of a texturing apparatus; the resultant substrate is again placed in the apparatus; and then an undercoat film and a magnetic film are formed on the substrate.

However, the aforementioned conventional production process for a magnetic recording medium includes complicated production steps, resulting in high production costs. Therefore, there has been keen demand for a production process for a magnetic recording medium, which encompasses a simplified production procedure.

SUMMARY OF THE INVENTION

In view of the foregoing, an object of the present invention is to provide a process for easily producing a magnetic recording medium exhibiting excellent magnetic characteristics.

The present invention provides a process for producing a magnetic recording medium characterized by forming an orientation-determining film, which determines the crystalline orientation of a film provided directly on the orientation-determining film, on a non-metallic substrate which has undergone texturing; subjecting the orientation-determining film to oxidation or nitridation; and forming a non-magnetic undercoat film and a magnetic film on the orientation-determining film.

The oxidation or nitridation is carried out by bringing the orientation-determining film into contact with an oxygen-containing gas or a nitrogen-containing gas.

The present invention also provides a process for producing a magnetic recording medium, which comprises forming an orientation-determining film, which determines the crystal orientation of a film provided directly on the orientation-determining film, on a non-metallic substrate which has undergone texturing; and forming a non-magnetic undercoat film and a magnetic film on the orientation-determining film, wherein the orientation-determining film is formed through sputtering by use of a sputtering gas containing nitrogen or a sputtering gas containing oxygen.

Preferably, the orientation-determining film comprises NiP (the content of P is 10–40 at %) as a primary component.

Preferably, the orientation-determining film comprises NiPX (wherein X is one or more species of Cr, Mo, Si, Mn, W, Nb, Ti, and Zr, and the content of X is 0–25 at %) as a primary component.

The present invention also provides a sputtering target for forming the orientation-determining film, which comprises NiPX (wherein X is one or more species of Cr, Mo, Si, Mn, W, Nb, Ti, and Zr, and the content of X is 0–25 at %) as a primary component.

The present invention also provides a magnetic recording medium comprising a non-metallic substrate which has undergone texturing; an orientation-determining film formed on the non-metallic substrate; and a non-magnetic undercoat film and a magnetic film, which are formed on the orientation-determining film, characterized in that the ratio of a coercive force in a circumferential direction of the medium (Hcc) to a coercive force in a radial direction of the medium (Hcr); i.e., Hcc/Hcr, is 1.1 or more.

The orientation-determining film has an average surface roughness (Ra) of less than 0.5 nm.

The magnetic recording medium of the present invention comprises a structure wherein a non-magnetic adhesive film, which prevents exfoliation of the orientation-determining film from the substrate, is formed between the non-metallic substrate and the orientation-determining film, and the non-magnetic adhesive film comprises one or more species of Cr, Mo, Nb, V, Re, Zr, W, and Ti.

The present invention also provides a magnetic recording and reproducing apparatus comprising the magnetic recording medium and a magnetic head for recording data onto the medium and reproducing the data therefrom.

DESCRIPTION OF THE PREFERRED EMBODIMENTS

Figure 1:
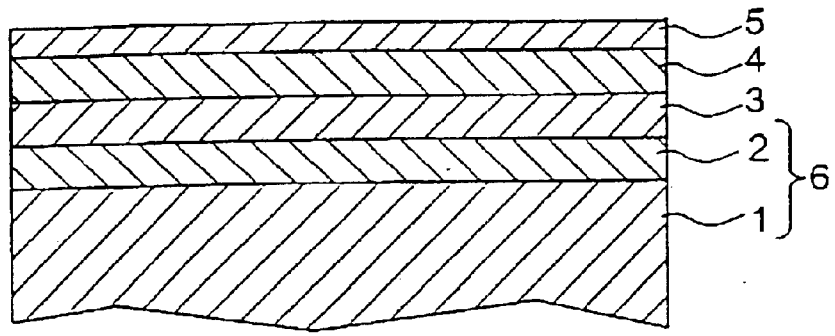
FIG. 1 is a partially cross-sectional view of one embodiment of the magnetic recording medium of the present invention.

FIG. 1 is a schematic representation showing an example embodiment of the magnetic recording medium of the present invention. The magnetic recording medium comprises a non-metallic substrate 1 which has undergone texturing, an orientation-determining film 2 formed on the substrate, a non-magnetic undercoat film 3, a magnetic film 4, and a protective film 5, the films 3 to 5 being successively formed on the film 2. Hereinafter, the structure of the non-metallic substrate 1 and the orientation-determining film 2 will be called a medium substrate 6.

The non-metallic substrate 1 is formed from a non-metallic material such as glass, ceramic, silicon, silicon carbide, or carbon. Particularly, from the viewpoint of durability and cost, a glass substrate is preferably employed.

The glass substrate is formed from amorphous glass or crystallized glass. The amorphous glass may be widely-used soda-lime glass, aluminocate glass, or aluminosilicate glass. The crystallized glass may be lithium-based crystallized glass.

Particularly, amorphous glass exhibiting uniform physical properties such as hardness is preferably employed as a material of the substrate, since the substrate can be subjected to uniform texturing.

Meanwhile, a ceramic substrate may be a widely-used sintered compact predominantly containing aluminum oxide, aluminum nitride, and silicon nitride; or fiber-reinforced material thereof.

The non-metallic substrate 1 is subjected to mechanical texturing or similar processing by use of a lapping tape containing fixed abrasive grains or by use of free abrasive grains, to have a textured surface.

Texture lines formed on the non-metallic substrate 1 through texturing are preferably along the circumferential direction of the substrate.

The average surface roughness (Ra) of the non-metallic substrate 1 is 0.1–1 nm (1–10 Å), preferably 0.3–0.8 nm (3–8 Å).

When the average surface roughness (Ra) is below the above range, the non-metallic substrate 1 is excessively smooth, and thus the substrate encounters difficulty in enhancing the magnetic anisotropy of the magnetic film 4. In contrast, when the average surface roughness (Ra) is in excess of the above range, the evenness of the medium is lowered, resulting in poor glide height characteristics. As a result, reducing the flying height of a magnetic head during reproduction of data becomes difficult.

As compared with a metallic material, the non-metallic substrate 1 has a high hardness and is difficult to texture. Therefore, when the substrate is subjected to texturing, abnormal protrusions such as fins are difficult to form, with the result that the maximum protrusion height (Rp) is lowered.

The orientation-determining film 2 is provided for determining the crystalline orientation of the non-magnetic undercoat film 3 formed on the film 2 and for determining the crystalline orientation of the magnetic film 4 formed on the film 3, to thereby enhance the magnetic anisotropy of the magnetic film 4. The orientation-determining film 2 determines the crystalline orientation of the non-magnetic undercoat film 3 and the magnetic film 4, and also functions as a film for forming fine crystal grains; i.e., the film 2 forms fine magnetic grains in the films 3 and 4.

The orientation-determining film 2 is preferably formed from a material containing NiP as a primary component. The content of P is 10–40 at %, preferably 15–35 at %.

The reasons for this are that, when the content of P is less than 10 at %, NiP is susceptible to magnetization. In contrast, when the content of P is in excess of 40 at %, the crystal orientation of the non-magnetic undercoat film 3 and the magnetic film 4 is easily impaired.

Alternatively, the orientation-determining film 2 is preferably formed from a material containing NiPX (wherein X is one or more species of Cr, Mo, Si, Mn, W, Nb, Ti, and Zr) as a primary component. The content of X is 0–25 at %, preferably 5–25 at %, more preferably 10–25 at %. When the content of X is in excess of 25 at %, the crystalline orientation of the non-magnetic undercoat film 3 and the magnetic film 4 is impaired, and the magnetic anisotropy of the magnetic film 4 is lowered.

As used herein, the term "primary component" refers to the case in which the content of the component is in excess of 50 at %.

The thickness of the orientation-determining film 2 is preferably 2–100 nm (20–1,000 Å). When the thickness is below the above range, the magnetic anisotropy of the magnetic film 4 is lowered, whereas when the thickness is in excess of the above range, the orientation-determining film 2 is easily exfoliated and production costs increase, which is unsatisfactory.

The orientation-determining film 2 may be or may not be subjected to texturing.

When orientation-determining film 2 is subjected to texturing, texture lines are preferably along the circumferential direction of the substrate.

The orientation-determining film 2 preferably has an average surface roughness (Ra) of 1 nm or less, from the viewpoint of glide height characteristics.

The average surface roughness (Ra) of the orientation-determining film 2 is more preferably less than 0.5 nm (5 Å), much more preferably less than 0.3 nm.

The orientation-determining film 2 is formed from a metallic material which has a relatively low hardness and is easily processed, such as NiPX. Therefore, when the film 2 is subjected to texturing, large protrusions such as fins and burrs are easily produced on the surface of the film, and thus the maximum protrusion height (Rp) tends to increase.

When the average surface roughness (Ra) of the orientation-determining film 2 is less than 0.5 nm (5 Å), the amount of abraded substance is reduced during texturing, and an increase in the maximum protrusion height (Rp) of the film 2 is prevented. Consequently, the maximum protrusion height (Rp) of the medium can be reduced, and deterioration of the glide height characteristics can be prevented.

The non-magnetic undercoat film 3 may be formed from conventionally known materials for undercoat film. For example, the film may be formed from an alloy of one or more species of Cr, Ti, Ni, Si, Ta, W, Mo, V, and Nb. Alternatively, the film 3 may be formed from an alloy of one or more of the above elements and other elements, so long as such "other elements" do not impede the crystallinity of the film.

Particularly, the film 3 is preferably formed from Cr or a Cr alloy (e.g., CrTi, CrW, CrMo, CrV, or CrSi).

The non-magnetic undercoat film 3 may be of a single-layer structure, or of a multi-layer structure formed of a plurality of films which are of the same composition or of different compositions. The thickness of the non-magnetic undercoat film 3 is 1–100 nm (10–1,000 Å), preferably 2–50 nm (20–500 Å).

The crystalline orientation of the non-magnetic undercoat film 3 is preferably (002).

The magnetic film 4 is preferably formed from a material containing Co as a primary component. The material may be, for example, an alloy of Co and one or more species of Cr, Pt, Ta, B, Ti, Ag, Cu, Al, Au, W, Nb, Zr, V, Ni, Fe, and Mo.

Preferable specific examples of the above material include materials predominantly containing a CoCrTa-, CoCrPt-, CoCrPtB- or CoCrPtTa-based alloy. Of these alloys, in particular, a CoCrPtTa-based alloy is preferably employed.

The thickness of the magnetic film 4 may be 5–30 nm (50–300 Å).

The crystalline orientation of the magnetic film 4 is preferably (110).

The magnetic film 4 may be of a single-layer structure, or of a multi-layer structure formed of a plurality of films which are of the same composition or of different compositions.

Preferably, a non-magnetic intermediate layer is provided between the non-magnetic undercoat film and the magnetic film, in order to further improve the crystal orientation of the magnetic film and to further enhance the effects of the present invention.

The non-magnetic intermediate layer may be formed from a CoCr alloy (content of Cr: 20–40 at %).

The protective film 5 may be formed from conventionally known materials. For example, the film may be formed from a material containing a single component such as carbon, silicon oxide, silicon nitride, or zirconium oxide; or a material predominantly containing such components.

The thickness of the protective film 5 is preferably 2–10 nm (20–100 Å).

If necessary, a lubrication film formed from a lubricant such as a fluorine-based liquid lubricant (e.g., perfluoropolyether) may be provided on the protective film 5.

In the magnetic recording medium of the present invention, the ratio of a coercive force in a circumferential direction of the medium (Hcc) to a coercive force in a radial direction of the medium (Hcr); i.e., Hcc/Hcr, is 1.1 or more, preferably 1.2 or more.

When the ratio Hcc/Hcr is below the above range, the magnetic anisotropy of the magnetic recording medium is insufficient, and magnetic characteristics of the medium, such as thermal stability, are unsatisfactory.

A first embodiment of the production process for a magnetic recording medium of the present invention will next be described by taking, as an example, production of the aforementioned magnetic recording medium.

Firstly, the non-metallic substrate 1 is subjected to texturing. Preferably, the substrate 1 is subjected to mechanical texturing by use of lapping tape containing fixed abrasive grains, or by use of free abrasive grains. During texturing, texture lines are preferably formed in the circumferential direction of the substrate.

The substrate may be subjected to chemical etching after mechanical texturing, in order to remove fine fins, burrs, and the like which are produced on the surface during mechanical texturing, and to obtain excellent surface evenness.

Subsequently, the orientation-determining film 2 is formed on the non-metallic substrate 1, to thereby form the medium substrate 6.

The orientation-determining film 2 is preferably formed through sputtering by use of a sputtering apparatus serving as a film formation apparatus.

When the orientation-determining film 2 is formed through sputtering, the aforementioned material constituting the film 2 is employed as a sputtering target.

The sputtering target is desirably a material containing, as a primary component, NiPX (wherein X is one or more species of Cr, Mo, Si, Mn, W, Nb, Ti, and Zr; and the content of X is 0–25 at %, preferably 5–25 at %, more preferably 10–25 at %).

When the content of X is in excess of the above range, the crystalline orientation of the non-magnetic undercoat film 3 and the magnetic film 4 is impaired, and the magnetic anisotropy of the film 4 is lowered.

The target may be a sintered alloy target or an alloy target produced through a casting method. Particularly, a sintered alloy target is preferably employed. Such a sintered alloy target may be produced by means of a conventionally known sintering method such as hot isostatic pressing (HIP) or hot pressing, from alloy powder of the aforementioned composition, a plurality of alloy powders which are mixed to obtain the aforementioned composition, or a mixture of mono-metallic powders. The aforementioned alloy powder and metallic powder may be produced by means of a conventionally known method such as a gas-atomizing method.

In order to form the orientation-determining film 2, the non-metallic substrate 1 is placed in a chamber of a sputtering apparatus, a sputtering gas such as argon gas is introduced into the chamber, and electricity is applied to the target, thereby depositing the target material onto the non-metallic substrate 1 through sputtering.

The orientation-determining film 2 may be formed through, instead of sputtering, plating (such as electroless plating), vacuum deposition, ion plating, or a similar process.

In the production process for the magnetic recording medium of the embodiment, after completion of the formation of the orientation-determining film 2, the film is subjected to oxidation.

Oxidation of the orientation-determining film 2 may be carried out by bringing the film 2 into contact with an oxygen-containing gas.

The oxygen-containing gas may be air, pure oxygen, or steam. Alternatively, the oxygen-containing gas may be an oxygen-enriched gas which consists of air containing a large amount of oxygen.

In order to bring the orientation-determining film 2 into contact with the oxygen-containing gas, after the film 2 is formed on the substrate 1 in the film formation apparatus (sputtering apparatus) to form the medium substrate 6 as described above, the oxygen-containing gas is introduced into the chamber of the film formation apparatus in which the medium substrate 6 is placed.

In this case, the content of oxygen in the gas to which the orientation-determining film 2 is exposed; i.e., the gas in the chamber, may be 1–100 vol %.

By use of such an oxygen-containing gas, oxidation of the film 2 can be easily carried out.

The process for bringing the orientation-determining film 2 into contact with the oxygen-containing gas is preferably carried out at a temperature lower than the temperature at which the material constituting the film 2 is crystallized; for example, at 280° C. or lower, in order to prevent the possibility that the orientation of the non-magnetic undercoat film 3 and the magnetic film 4 might be adversely affected by crystallization of the film 2. The temperature at which the process is carried out may be determined to be ambient temperature or higher. The period of time for the process to be carried out (i.e., the time during which the film 2 is exposed to the oxygen-containing gas) may be appropriately determined in accordance with, for example, the content of oxygen in the oxygen-containing gas.

Through this process, at least the area in proximity to the surface of the orientation-determining film 2 is oxidized.

Subsequently, the non-magnetic undercoat film 3 is formed on the orientation-determining film 2. The non-magnetic undercoat film 3 may be formed through sputtering by use of a sputtering apparatus.

Subsequently, the magnetic film 4 is formed on the non-magnetic undercoat film 3. The magnetic film 4 may be formed through sputtering by use of a sputtering apparatus.

Subsequently, the protective film 5 is formed on the magnetic film 4. The protective film 5 may be formed through, for example, plasma CVD or sputtering.

In the production process for the magnetic recording medium of the embodiment, the orientation-determining film 2 is formed on the non-metallic substrate 1 which has undergone texturing, and then the film 2 is subjected to oxidation. Therefore, even though the substrate 1 is formed from a non-metallic substrate, which makes imparting high magnetic anisotropy to the magnetic film difficult, the crystalline orientation of the non-magnetic undercoat film 3 and the magnetic film 4, which are being formed over the substrate 1, can be improved, and the magnetic anisotropy of the magnetic film 4 can be enhanced.

Therefore, magnetic characteristics of the magnetic recording medium, such as thermal stability, error rate, and S/N ratio, can be improved.

In general, thermal stability is excellent in a medium which has a high crystal magnetic anisotropy constant (Ku). In the magnetic recording medium of the embodiment of the present invention, thermal stability is thought to be enhanced, since the crystal magnetic anisotropy constant (Ku) is enhanced by enhancement of magnetic anisotropy in a circumferential direction.

As used herein, the term "thermal stability" refers to the degree of difficulty in occurrence of thermal decay.

As used herein, the term "thermal decay" refers to a phenomenon in which recording bits become unstable and recorded data are thermally lost. In a magnetic recording apparatus, thermal decay is manifested in the form of reduction in reproduction output of recorded data with the passage of time.

According to the production process, the half power width of a reproduction output peak is narrowed, and thus the resolution of the reproduction output can be enhanced. Therefore, a magnetic recording medium in which the error rate is improved can be produced.

When magnetic anisotropy is enhanced, coercive force and reproduction output (S) are improved, yielding an improvement in the S/N ratio.

In addition, crystal grains in the non-magnetic undercoat film 3 become fine. Consequently, magnetic grains in the magnetic film 4, which is grown under the influence of the film 3, may become fine and uniform, resulting in reduction in noise (N). Therefore, reproduction output per unit film thickness may be enhanced, and thus the film 4 may be thinned. When the film 4 is thinned, excessive growth of the magnetic grains is suppressed, and the grains may become even finer, which results in further reduction in noise. Consequently, the S/N ratio can be further improved.

In the production process of the embodiment, the orientation-determining film 2 is formed on the non-metallic substrate 1 which has undergone texturing in a film formation apparatus such as a sputtering apparatus, and subsequently, the non-magnetic undercoat film 3 and the magnetic film 4 are formed on the orientation-determining film 2 in the same apparatus without removal of the thus-formed medium substrate 6 from the apparatus.

Therefore, the production process can be simplified, and production costs can be reduced.

In contrast, when a conventional production process is employed, after the film formation step (in which a NiP hard film is formed on a substrate) is carried out, the resultant substrate is temporarily removed from a film formation apparatus and is subjected to texturing (i.e., the hard film is subjected to texturing). Subsequently another film formation step (in which a non-magnetic undercoat film and a magnetic film are formed) is carried out, thus complicating the production process.

When a sputtering target containing, as a primary component, NiP (wherein the content of P is 0–25 at %) is employed, the orientation-determining film 2 can be easily formed.

When a sputtering target containing, as a primary component, NiPX (wherein X is one or more species of Cr, Mo, Si, Mn, W, Nb, Ti, and Zr; and the content of X is 0–25 at %) is employed, the orientation-determining film 2 can be easily formed.

The aforementioned magnetic recording medium includes the non-metallic substrate 1 which has undergone texturing, the orientation-determining film 2 formed on the substrate 1, and the non-magnetic undercoat film 3 and the magnetic film 4, which are formed on the film 2; and the ratio of a coercive force in a circumferential direction of the medium (Hcc) to a coercive force in a radial direction of the medium (Hcr); i.e., Hcc/Hcr, is 1.1 or more. Therefore, the magnetic recording medium exhibits high magnetic anisotropy and excellent magnetic characteristics with respect to such parameters as thermal stability, error rate, and S/N ratio. In addition, the production process for the medium can be simplified, and production costs can be reduced.

When the orientation-determining film 2 included in the aforementioned magnetic recording medium is not subjected to texturing, a texturing step is not necessary during production of the medium. Thus the production process is simplified and production costs can be reduced. In addition, deterioration of glide height characteristics can be prevented. The deterioration occurs when the film 2 is subjected to texturing, because the surface of the film 2 becomes rough, and the maximum protrusion height (Rp) of the surface of the medium increases.

Meanwhile, when the orientation-determining film 2 is subjected to texturing, the crystalline orientation of the non-magnetic undercoat film 3 and the magnetic film 4 can further be improved, and the magnetic anisotropy of the film 4 can be further enhanced.

Figure 2:
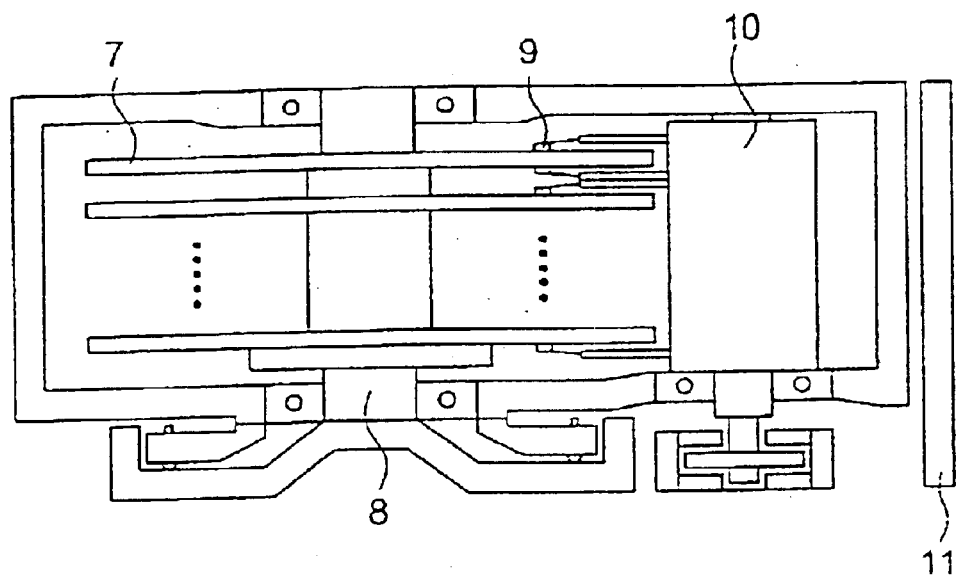
FIG. 2 is a partially cross-sectional view of one embodiment of the magnetic recording and reproducing apparatus of the present invention.

FIG. 2 shows an embodiment of the magnetic recording and reproducing apparatus including the magnetic recording medium. The apparatus includes a magnetic recording medium 7, the structure of the medium being shown in FIG. 1; a medium-driving portion 8 which rotates the medium 7; a magnetic head 9 which is employed for recording of data onto the medium 7 and for reproduction of the data from the medium 7; a head-driving portion 10; and a recorded/reproduced signal-processing system 11. In the system 11, incoming external signals are processed and sent to the magnetic head 9, or reproduction signals from the head 9 are processed and sent to the outside.

When the magnetic recording and reproducing apparatus is employed, recording density can be increased, since the magnetic anisotropy of the magnetic recording medium can be enhanced. Thus S/N ratio and error rate can be improved. In addition, loss of recorded data which is attributed to thermal decay can be prevented.

A second embodiment of the production process for a magnetic recording medium of the present invention will next be described.

The production process of the second embodiment differs from that of the first embodiment in that an orientation-determining film 2 is subjected to nitridation instead of oxidation.

Nitridation of the orientation-determining film 2 may be carried out by bringing the film 2 into contact with a nitrogen-containing gas. For example, a nitrogen-containing gas may be introduced into a chamber of a film formation apparatus in which a medium substrate 6 is placed.

The nitrogen-containing gas may be air or pure nitrogen. Alternatively, the nitrogen-containing gas may be a nitrogen-enriched gas which consists of air containing a large amount of nitrogen.

In this case, the nitrogen content of the gas to which the orientation-determining film 2 is exposed may be 1–100 vol %. By use of such a nitrogen-containing gas, nitridation of the film 2 can be easily carried out.

The process for bringing the orientation-determining film 2 into contact with the nitrogen-containing gas is preferably carried out at a temperature lower than the temperature at which the material constituting the film 2 is crystallized; for example, at 280° C. or lower, in order to prevent the possibility that the orientation of the non-magnetic undercoat film 3 and the magnetic film 4 might be adversely affected by crystallization of the film 2. The temperature at which the process is carried out may be determined to be ambient temperature or higher. The period of time for the process to be carried out (i.e., the time during which the film 2 is exposed to the nitrogen-containing gas) may be appropriately determined in accordance with, for example, the content of nitrogen in the nitrogen-containing gas.

Through this process, at least the area in the vicinity of the surface of the orientation-determining film 2 is nitridized.

In the production process for the magnetic recording medium of the second embodiment, the orientation-determining film 2 is formed on a non-metallic substrate 1 which has undergone texturing, and then the film 2 is subjected to nitridation. Therefore, similar to the case in which the production process of the first embodiment including an oxidation step is carried out, the crystalline orientation of a non-magnetic undercoat film 3 and a magnetic film 4 can be improved, and the magnetic anisotropy of the magnetic film 4 can be enhanced. As a result, magnetic characteristics of the magnetic recording medium, such as thermal stability, can be improved.

In the production process of the second embodiment, the orientation-determining film 2 is formed in a film formation apparatus, and subsequently the non-magnetic undercoat film 3 and the magnetic film 4 are formed on the orientation-determining film 2 in the same apparatus. Therefore, the production process can be simplified, and production costs can be reduced.

According to the production process of the first or second embodiment, the magnetic anisotropy of the magnetic film 4 can be improved through oxidation or nitridation of the orientation-determining film 2. The mechanism thereof is thought to be as follows: the orientation-determining film 2 is imparted with a certain characteristic, influenced by the surface of the substrate 1 which has undergone texturing; the characteristic, which is usually difficult to express, is expressed through oxidation or nitridation; and thus the characteristic contributes to improvement of the crystalline orientation of the undercoat film 3 and the magnetic film 4, thereby improving the magnetic anisotropy of the film 4.

In the production process of the first or second embodiment, the orientation-determining film 2 is subjected to oxidation or nitridation in the chamber of the film formation apparatus. However, the film 2 may be subjected to oxidation or nitridation outside the film formation apparatus.

A third embodiment of the production process for a magnetic recording medium of the present invention will next be described with reference to FIG. 1.

A characteristic feature of the production process of the third embodiment resides in that an orientation-determining film 2 is formed on a substrate 1 through sputtering, and a sputtering gas containing nitrogen is introduced into a chamber of a sputtering apparatus during formation of the film 2.

The sputtering gas may be a gas mixture of a customarily used sputtering gas such as argon gas and a nitrogen-containing gas such as air, pure nitrogen, or nitrogen-enriched gas.

When the content of nitrogen in the sputtering gas is very high, film formation efficiency is lowered, whereas when the content of nitrogen is very low, a magnetic film fails to be imparted with satisfactory magnetic anisotropy. The content of nitrogen in the sputtering gas is preferably 1–80 vol %, more preferably 2–50 vol %, much more preferably 5–30 vol %.

When a sputtering gas containing nitrogen is employed, the orientation-determining film 2 contains nitrogen.

In the production process for the magnetic recording medium of the third embodiment, a sputtering gas containing nitrogen is employed. Therefore, similar to the case in which the production process of the first or second embodiment (in which the orientation-determining film 2 is subjected to oxidation or nitridation) is carried out, the crystalline orientation of a non-magnetic undercoat film 3 and a magnetic film 4 can be improved, and the magnetic anisotropy of the magnetic film 4 can be enhanced. As a result, magnetic characteristics of the magnetic recording medium, such as thermal stability, can be improved.

The magnetic anisotropy of the magnetic film 4 can be improved through use of a sputtering gas containing nitrogen. The mechanism thereof is thought to be as follows: the orientation-determining film 2 contains nitrogen, and thus the film 2 is easily affected by the surface of the substrate 1; consequently, the film 2 is imparted with a certain characteristic, affected by the surface of the substrate 1 which has undergone texturing; and the characteristic contributes to improvement of the crystalline orientation of the undercoat film 3 and the magnetic film 4, thereby improving the magnetic anisotropy of the film 4.

A fourth embodiment of the production process for a magnetic recording medium of the present invention will next be described with reference to FIG. 1.

A characteristic feature of the production process of the third embodiment resides in that an orientation-determining film 2 is formed on a substrate 1 through sputtering, and a sputtering gas containing oxygen is introduced into a chamber of a sputtering apparatus during formation of the film 2.

The sputtering gas may be a gas mixture of a customarily used sputtering gas such as argon gas and an oxygen-containing gas such as air, pure oxygen, or oxygen-enriched gas.

When the content of oxygen in the sputtering gas is very high, film formation efficiency is lowered, whereas when the content of oxygen is very low, a magnetic film fails to be imparted with satisfactory magnetic anisotropy. The content of oxygen in the sputtering gas is preferably 1–80 vol %, more preferably 2–50 vol %, much more preferably 5–30 vol %.

When a sputtering gas containing oxygen is employed, the orientation-determining film 2 contains oxygen.

In the production process for the magnetic recording medium of the fourth embodiment, a sputtering gas containing oxygen is employed. Therefore, similar to the case in which the production process of the first or second embodiment (in which the orientation-determining film 2 is subjected to oxidation or nitridation) is carried out, the crystalline orientation of a non-magnetic undercoat film 3 and a magnetic film 4 can be improved, and the magnetic anisotropy of the magnetic film 4 can be enhanced. As a result, magnetic characteristics of the magnetic recording medium, such as thermal stability, can be improved.

The magnetic anisotropy of the magnetic film 4 can be improved through use of a sputtering gas containing oxygen. The mechanism thereof is thought to be as follows: the orientation-determining film 2 contains oxygen, and thus the film 2 is easily affected by the surface of the substrate 1; consequently, the film 2 is imparted with a certain characteristic, affected by the surface of the substrate 1 which has undergone texturing; and the characteristic contributes to improvement of the crystalline orientation of the undercoat film 3 and the magnetic film 4, thereby improving the magnetic anisotropy of the film 4.

In the production process of the third or fourth embodiment, the orientation-determining film 2 is formed in a film formation apparatus, and subsequently the non-magnetic undercoat film 3 and the magnetic film 4 are formed on the orientation-determining film 2 in the same apparatus. Therefore, the production process can be simplified, and production costs can be reduced.

According to the production process of the third or fourth embodiment, surface treatment is not necessary after formation of the orientation-determining film 2. Therefore, the production process can be further simplified, and production costs can be further reduced.

Figure 3:
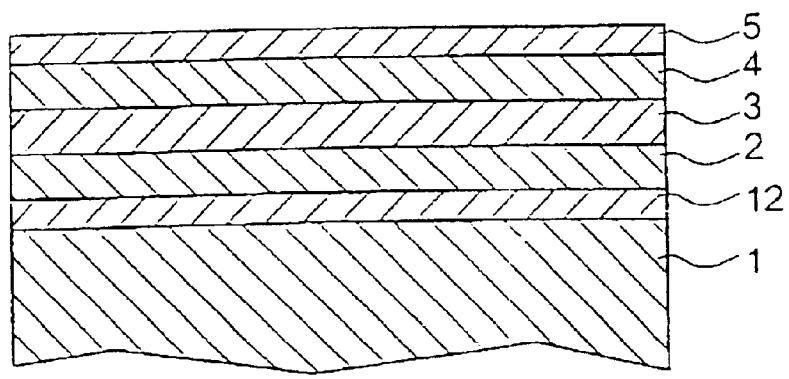
FIG. 3 is a partially cross-sectional view of another embodiment of the magnetic recording medium of the present invention.

As shown in FIG. 3, the magnetic recording medium of the present invention may include a non-magnetic adhesive film 12 provided between the orientation-determining film 2 and the non-metallic substrate 1, the adhesive film 12 preventing exfoliation of the film 2 from the substrate 1.

The non-magnetic adhesive film 12 may be formed of a material which has excellent adhesion to the non-metallic substrate 1 and the orientation-determining film 2; for example, an alloy predominantly containing one or more species of Cr, Mo, Nb, V, Re, Zr, W, and Ti.

Examples of preferable materials for forming the non-magnetic adhesive film 12 include Cr, and CrMo-, CrTi-, CrV-, and CrW-based alloys.

The thickness of the non-magnetic adhesive film 12 is preferably 200 nm or less; for example, 5–200 nm. When the thickness is in excess of 200 nm, the magnetic film 4 fails to be imparted with satisfactory magnetic anisotropy.

The non-magnetic adhesive film 12 may be formed through, for example, sputtering.

As shown in FIG. 3, when the adhesive film 12 is provided, exfoliation of the orientation-determining film 2 can be prevented. In addition, when the medium reaches a high temperature in a topical portion during reproduction of recorded data, the adhesive film can immediately diffuse the heat of the portion in a medium surface direction, thereby suppressing temperature rise and preventing deterioration of magnetic characteristics.

EXAMPLES

The present invention will next be described in detail by way of examples. Unless indicated otherwise herein, all parts, percents, ratios and the like are by weight.

Test Examples 1 Through 4

A surface of an amorphous glass plate 1 (diameter: 65 mm, thickness: 0.635 mm) was subjected to mechanical texturing in a circumferential direction of the substrate, so as to attain the average surface roughness (Ra) shown in Table 1. The average surface roughness (Ra) was measured by use of an AFM (product of Digital Instrument).

The non-metallic substrate 1 was completely washed and dried. Subsequently, the substrate 1 was placed in a chamber of a DC magnetron sputtering apparatus (Model 3010, product of ANELVA), and the chamber of the apparatus was evacuated to $2 \times 10^{-7}$ Pa. Thereafter, argon gas serving as a sputtering gas was introduced into the chamber, and an orientation-determining film 2 was formed on the substrate 1 through sputtering.

Subsequently, air serving as an oxygen-containing gas was introduced into the chamber of the sputtering apparatus, and the orientation-determining film 2 of a medium substrate 6 was brought into contact with air for five seconds to carry out oxidation. Oxidation was carried out at 200° C. During oxidation, the content of oxygen in the chamber was set at 20 vol %.

Subsequently, the medium substrate 6 was heated to 200° C. by use of the sputtering apparatus, and then a non-magnetic undercoat film 3 containing Cr was formed on the orientation-determining film 2 through sputtering. A magnetic film 4 containing a CoCrPtTa-based alloy was formed on the non-magnetic undercoat film 3 through sputtering. A protective film 5 containing carbon was formed on the magnetic film 4 through sputtering.

On the protective film 5, a lubrication film containing perfluoropolyether was formed through dipping.

Magnetostatic characteristics of the produced magnetic recording media were measured by use of a vibrating sample magnetometer (VSM).

The ratio of Hc in a circumferential direction of the medium to Hc in a radial direction of the medium was measured, and the ratio was regarded as an index of magnetic anisotropy.

Electromagnetic conversion characteristics of the magnetic recording media were measured by use of read/write analyzer RWA1632 and spin stand S1701MP (products of GUZIK). In order to evaluate electromagnetic conversion characteristics, measurement was performed by use of, as a magnetic head, a complex-type thin film magnetic recording head containing a giant magnetoresistive (GMR) element at the reproduction portion, and track-recording density was set at 350 kFCI.

Thermal stability of each of the respective magnetic recording media was measured in terms of reduction in output at a recording density of 40 kFCI at 70° C. by use of the spin stand S1701MP. In Table 1, the symbol "PW50" refers to half power width of output peak.

Test Example 5

The procedure of Test Example 1 was repeated, except that, after the orientation-determining film 2 was formed, nitridation was carried out through introduction of pure nitrogen into the chamber instead of oxidation through introduction of air into the chamber to produce a magnetic recording medium. During nitridation, the content of nitrogen in the chamber was set at 20 vol %.

Test Example 6

The procedure of Test Example 1 was repeated, except that the orientation-determining film 2 was formed from a gas mixture of argon and nitrogen (argon content: 80 vol %, nitrogen content: 20 vol %) serving as a sputtering gas; and that oxidation was not carried out to produce a magnetic recording medium.

Test Example 7

The procedure of Test Example 1 was repeated, except that a non-magnetic adhesive film 12 (thickness: 100 Å) containing Cr was formed between the non-metallic substrate 1 and the orientation-determining film 2 through sputtering to produce a magnetic recording medium.

Test Example 8

The procedure of Test Example 1 was repeated, except that the non-metallic substrate 1 was not subjected to texturing to produce a magnetic recording medium.

Test Example 9

The procedure of Test Example 1 was repeated, except that the orientation-determining film 2 was not subjected to oxidation (i.e., the film 2 was not brought into contact with air) to produce a magnetic recording medium.

Table 1 shows test results of the respective magnetic recording media produced through the procedures of the respective Test Examples.

TABLE 1

| | Non-metallic substrate | | Orientation-determining film | | | Coercive force (Oe) | Magnetic anisotropy (—) | PW50 (ns) | Thermal stability (%/decade) | Note |
|---|---|---|---|---|---|---|---|---|---|---|
| | Texturing | Surface roughness Ra (Å) | Material | Thickness (Å) | Surface treatment | | | | | |
| Test Ex. 1 | Yes | 7 | Ni20P | 500 | Oxidation | 3500 | 1.25 | 15.25 | 0.33 | |
| Test Ex. 2 | Yes | 5 | Ni20P | 500 | Oxidation | 3500 | 1.14 | 15.36 | 0.35 | |
| Test Ex. 3 | Yes | 7 | Ni20P | 50 | Oxidation | 3500 | 1.22 | 15.27 | 0.32 | |
| Test Ex. 4 | Yes | 6 | Ni25P | 300 | Oxidation | 3500 | 1.24 | 15.26 | 0.36 | |
| Test Ex. 5 | Yes | 7 | Ni20P | 500 | Nitridation | 3400 | 1.19 | 15.33 | 0.39 | |
| Test Ex. 6 | Yes | 7 | Ni20P | 500 | — | 3300 | 1.15 | 15.36 | 0.38 | Use of $N_2$-containing sputtering gas |
| Test Ex. 7 | Yes | 7 | Ni20P | 500 | Oxidation | 3500 | 1.20 | 15.20 | 0.35 | Formation of adhesive film |
| Test Ex. 8 | No | 4 | Ni20P | 500 | Oxidation | 2900 | 1.00 | 16.06 | 0.59 | |
| Test Ex. 9 | Yes | 6 | Ni20P | 500 | — | 2100 | 1.00 | 16.85 | 0.83 | |

Test Examples 10 Through 14

A surface of a glass substrate 1 (glass ceramic TS-10SX, product of Ohara Inc.) (diameter: 65 mm, thickness: 0.635 mm) was subjected to mechanical texturing in a circumferential direction of the substrate, so as to attain an average surface roughness (Ra) of 5 Å (0.5 nm). The average surface roughness (Ra) was measured by use of an AFM (product of Digital Instrument).

The non-metallic substrate 1 was completely washed and dried. Subsequently, the substrate 1 was placed in a chamber of a DC magnetron sputtering apparatus (Model 3010, product of ANELVA), and the chamber of the apparatus was evacuated to $2 \times 10^{-7}$ Pa. Thereafter, argon gas serving as a sputtering gas was introduced into the chamber, and an adhesive film containing Cr10Mo (thickness: 100 Å) was formed on the substrate 1 through sputtering, and then an orientation-determining film 2 was formed on the adhesive film. The composition of the orientation-determining film 2 is shown in Table 2.

Subsequently, the oxygen-containing gas shown in Table 2 was introduced into the chamber of the sputtering apparatus, and the surface of the orientation-determining film 2 of a medium substrate 6 was brought into contact with the gas for five seconds, to thereby carry out oxidation. Oxidation was carried out at 200° C. and the pressure shown in Table 2. During oxidation, the content of oxygen in the chamber was set at 20 vol %.

Subsequently, the medium substrate 6 was heated to 200° C. by use of the sputtering apparatus, and then a non-magnetic undercoat film 3 containing CrMo (thickness: 200 Å) was formed on the orientation-determining film 2 through sputtering. A non-magnetic intermediate film containing CoCr (thickness: 30 Å) was formed on the non-magnetic undercoat film 3 through sputtering, and a magnetic film 4 containing a CoCrPtB-based alloy (thickness: 200 Å) was formed on the intermediate film. A protective film 5 containing carbon was formed on the magnetic film 4 through sputtering.

On the protective film 5, a lubrication film containing perfluoropolyether was formed through dipping.

The test results are shown in Table 2.

Test Examples 15 Through 25

The procedure of Test Example 11 was repeated, except that the conditions in relation to the oxygen-containing gas were changed as shown in Table 3, to thereby produce a magnetic recording medium.

The test results are shown in Table 3.

Test Examples 26 Through 42

The procedure of Test Example 11 was repeated, except that the conditions in relation to the surface roughness, the orientation-determining film, and the oxygen-containing gas were changed as shown Table 4, to thereby produce a magnetic recording medium. Test Example 41 employed a glass substrate (tempered glass, product of Nippon Sheet Glass Co., Ltd.). Test Example 42 employed an alumina-sintered substrate (formed from aluminum oxide).

The test results are shown in Table 4.

Test Examples 43 Through 53

A surface of a glass substrate 1 (glass ceramic TS-10SX, product of Ohara Inc.) (diameter: 65 mm, thickness: 0.635 mm) was subjected to mechanical texturing in a circumferential direction of the substrate, so as to attain an average surface roughness (Ra) of 5 Å (0.5 nm). The average surface roughness (Ra) was measured by use of an AFM (product of Digital Instrument).

The non-metallic substrate 1 was completely washed and dried. Subsequently, the substrate 1 was placed in a chamber of a DC magnetron sputtering apparatus (Model 3010, product of ANELVA), and the chamber of the apparatus was evacuated to $2 \times 10^{-7}$ Pa. Thereafter, argon gas serving as a sputtering gas was introduced into the chamber, and an adhesive film containing Cr (thickness: 50 Å) was formed on the substrate 1 through sputtering, and then an orientation-determining film 2 was formed on the adhesive film. The composition of the orientation-determining film 2 is shown in Table 5.

Subsequently, the nitrogen-containing gas shown in Table 5 was introduced into the chamber of the sputtering apparatus, and the surface of the orientation-determining film 2 of a medium substrate 6 was brought into contact with the gas for five seconds, to thereby carry out nitridation. Nitridation was carried out at 200° C. and the pressure shown in Table 5. During nitridation, the content of nitrogen in the chamber was set at 20 vol %.

Subsequently, the medium substrate 6 was heated to 200° C. by use of the sputtering apparatus, and then a non-magnetic undercoat film 3 (thickness: 150 Å) containing a Cr layer and a CrW layer was formed on the orientation-determining film 2 through sputtering. A non-magnetic intermediate film containing CoCr (thickness: 30 Å) was formed on the non-magnetic undercoat film 3 through sputtering. A magnetic film 4 (thickness: 200 Å) containing a CoCrPtBCu-alloy layer (thickness: 180 Å) and a CoCrPtTa-alloy layer (thickness: 20 Å) was formed on the intermediate film. A protective film 5 containing carbon was formed on the magnetic film 4 through sputtering.

On the protective film 5, a lubrication film containing perfluoropolyether was formed through dipping.

The test results are shown in Table 5.

Test Examples 54 Through 64

A surface of a glass substrate 1 (glass ceramic TS-10SX, product of Ohara Inc.) (diameter: 65 mm, thickness: 0.635 mm) was subjected to mechanical texturing in a circumferential direction of the substrate, so as to attain an average surface roughness (Ra) of 5 Å (0.5 nm). The average surface roughness (Ra) was measured by use of an AFM (product of Digital Instrument).

The non-metallic substrate 1 was completely washed and dried. Subsequently, the substrate 1 was placed in a chamber of a DC magnetron sputtering apparatus (Model 3010, product of ANELVA), and the chamber of the apparatus was evacuated to $2 \times 10^{-7}$ Pa. Thereafter, argon gas serving as a sputtering gas was introduced into the chamber, and an adhesive film containing CrW (thickness: 100 Å) was formed on the substrate 1 through sputtering, and then an orientation-determining film 2 was formed on the adhesive film. The composition of the orientation-determining film 2 is shown in Table 6.

Subsequently, a medium substrate 6 was heated to 200° C. by use of the sputtering apparatus, and then a non-magnetic undercoat film 3 (thickness: 150 Å) containing a Cr layer and a CrW layer was formed on the orientation-determining film 2 through sputtering. The sputtering gas (film formation gas) shown in Table 6 was employed for sputtering. A non-magnetic intermediate film containing CoCr (thickness: 30 Å) was formed on the non-magnetic undercoat film 3 through sputtering. A magnetic film 4 containing a CoCrPtTaZr-based alloy (thickness: 180 Å) was formed on the intermediate film. A protective film 5 containing carbon was formed on the magnetic film 4 through sputtering.

On the protective film 5, a lubrication film containing perfluoropolyether was formed through dipping.

The test results are shown in Table 6.

TABLE 2

| Test Ex. | Non-metallic substrate Texturing | Non-metallic substrate Surface roughness Ra (Å) | Orientation-determining film Material (at %) | Orientation-determining film Thickness (Å) | Surface Treatment Treatment | Surface Treatment Type of gas | Surface Treatment Pressure (Pa) | Coercive force (Oe) | Magnetic anisotropy | PW50 (ns) | Thermal stability (%/decade) |
|---|---|---|---|---|---|---|---|---|---|---|---|
| 10 | Yes | 5 | Ni18P | 400 | Oxidation | 20% O2—Ar | 2 | 3950 | 1.28 | 14.72 | 0.21 |
| 11 | Yes | 5 | Ni25P | 400 | Oxidation | 20% O2—Ar | 2 | 3950 | 1.25 | 14.78 | 0.23 |
| 12 | Yes | 5 | Ni33P | 400 | Oxidation | 20% O2—Ar | 2 | 3900 | 1.19 | 14.93 | 0.28 |
| 13 | Yes | 5 | Ni40P | 400 | Oxidation | 20% O2—Ar | 2 | 3700 | 1.15 | 15.15 | 0.33 |
| 14 | Yes | 5 | Ni50P | 400 | Oxidation | 20% O2—Ar | 2 | 3000 | 1.03 | 15.87 | 0.52 |

TABLE 3

| Test Ex. | Non-metallic substrate Texturing | Non-metallic substrate Surface roughness Ra (Å) | Orientation-determining film Material (at %) | Orientation-determining film Thickness (Å) | Surface Treatment Treatment | Surface Treatment Type of gas | Surface Treatment Pressure (Pa) | Coercive force (Oe) | Magnetic anisotropy | PW50 (ns) | Thermal stability (%/decade) |
|---|---|---|---|---|---|---|---|---|---|---|---|
| 15 | Yes | 5 | Ni18P | 400 | — | — | — | 2500 | 1 | 16.28 | 0.61 |
| 16 | Yes | 5 | Ni18P | 400 | Oxidation | 1% O2—Ar | 2 | 3600 | 1.15 | 15.22 | 0.35 |
| 17 | Yes | 5 | Ni18P | 400 | Oxidation | 5% O2—Ar | 2 | 3700 | 1.18 | 15.09 | 0.31 |
| 18 | Yes | 5 | Ni18P | 400 | Oxidation | 10% O2—Ar | 2 | 3800 | 1.23 | 14.92 | 0.26 |
| 10 | Yes | 5 | Ni18P | 400 | Oxidation | 20% O2—Ar | 2 | 3950 | 1.28 | 14.72 | 0.21 |
| 19 | Yes | 5 | Ni18P | 400 | Oxidation | 50% O2—Ar | 2 | 3900 | 1.27 | 14.77 | 0.22 |
| 20 | Yes | 5 | Ni18P | 400 | Oxidation | 100% O2 | 2 | 3850 | 1.28 | 14.78 | 0.22 |
| 21 | Yes | 5 | Ni18P | 400 | Oxidation | 20% O2—Ar | 0.2 | 3750 | 1.2 | 15.01 | 0.29 |
| 22 | Yes | 5 | Ni18P | 400 | Oxidation | 20% O2—Ar | 0.2 | 3900 | 1.24 | 14.83 | 0.24 |
| 23 | Yes | 5 | Ni18P | 400 | Oxidation | 20% O2—Ar | 5 | 3900 | 1.3 | 14.71 | 0.20 |
| 24 | Yes | 5 | Ni18P | 400 | Oxidation | 20% O2—Ar | 10 | 3850 | 1.27 | 14.80 | 0.23 |
| 25 | Yes | 5 | Ni18P | 400 | Oxidation | 20% O2—Ar | 30 | 3800 | 1.27 | 14.84 | 0.24 |

TABLE 4

| Test Ex. | Non-metallic substrate Texturing | Non-metallic substrate Surface roughness Ra (Å) | Orientation-determining film Material (at %) | Orientation-determining film Thickness (Å) | Surface Treatment Treatment | Surface Treatment Type of gas | Surface Treatment Pressure (Pa) | Coercive force (Oe) | Magnetic anisotropy | PW50 (ns) | Thermal stability (%/decade) |
|---|---|---|---|---|---|---|---|---|---|---|---|
| 26 | Yes | 5 | Ni20P5Cr | 400 | Oxidation | 20% O2—Ar | 0.8 | 4100 | 1.25 | 14.67 | 0.21 |
| 27 | Yes | 5 | Ni20P10Cr | 400 | Oxidation | 20% O2—Ar | 0.8 | 4050 | 1.25 | 14.71 | 0.22 |
| 28 | Yes | 5 | Ni10P10Mo | 400 | Oxidation | 40% Air-Ar | 1.2 | 3800 | 1.22 | 14.94 | 0.27 |
| 29 | Yes | 5 | Ni10P25Mo | 400 | Oxidation | 40% Air-Ar | 1.2 | 3800 | 1.24 | 14.90 | 0.26 |
| 30 | Yes | 5 | Ni10P35Mo | 400 | Oxidation | 40% Air-Ar | 1.2 | 2900 | 1 | 16.00 | 0.55 |
| 31 | Yes | 5 | Ni25P7Si | 400 | Oxidation | 100% Air | 1.5 | 3600 | 1.13 | 15.26 | 0.36 |
| 32 | Yes | 5 | Ni24P6Mn | 400 | Oxidation | 100% Air | 1.5 | 3850 | 1.16 | 15.02 | 0.31 |
| 33 | Yes | 2 | Ni25P5W | 300 | Oxidation | 5% H2O—Ar | 1 | 3900 | 1.1 | 15.11 | 0.34 |
| 34 | Yes | 3 | Ni25P5W | 300 | Oxidation | 5% H2O—Ar | 1 | 4000 | 1.15 | 14.94 | 0.29 |
| 35 | Yes | 5 | Ni25P5W | 300 | Oxidation | 5% H2O—Ar | 1 | 4200 | 1.22 | 14.66 | 0.22 |
| 36 | Yes | 10 | Ni25P5W | 300 | Oxidation | 5% H2O—Ar | 1 | 4400 | 1.26 | 14.45 | 0.16 |
| 37 | Yes | 5 | Ni22P8Nb | 500 | Oxidation | 20% O2—Ar | 0.8 | 3900 | 1.21 | 14.89 | 0.27 |
| 38 | Yes | 5 | Ni18P12Ti | 700 | Oxidation | 100% Air | 0.8 | 4000 | 1.19 | 14.86 | 0.27 |
| 39 | Yes | 5 | Ni5P5Zr | 500 | Oxidation | 20% O2—Ar | 0.8 | Not available due to magnetization of orientation-determining film | | | |
| 40 | Yes | 5 | Ni15P5Zr | 500 | Oxidation | 20% O2—Ar | 0.8 | 4000 | 1.15 | 14.94 | 0.29 |
| 41*1 | Yes | 5 | Ni15P5Zr | 500 | Oxidation | 20% O2—Ar | 0.8 | 3900 | 1.12 | 15.07 | 0.33 |
| 42*2 | Yes | 9 | Ni15P5Zr | 500 | Oxidation | 20% O2—Ar | 0.8 | 3800 | 1.1 | 15.18 | 0.36 |

*1In Test Example 41, a glass substrate was employed. Tempered glass GD7 (product of Nippon Sheet Glass Co., Ltd.): diameter 65 mm, thickness 0.635 mm, surface roughness 0.8 nm.

*2In Test Example 42, an alumina-sintered substrate was employed. Aluminum oxide: purity 99.99%, diameter 65 mm, thickness 0.635 mm, surface roughness 1.0 nm

TABLE 5

| | | Non-metallic substrate | | Orientation-determining film | | Surface Treatment | | | Coercive force (Oe) | Magnetic anisotropy | PW50 (ns) | Thermal stability (%/decade) |
|---|---|---|---|---|---|---|---|---|---|---|---|---|
| Test Ex. | Texturing | Surface roughness Ra (Å) | Material (at %) | | Thickness (Å) | Treatment | Type of gas | Pressure (Pa) | | | | |
| 43 | Yes | 5 | Ni18P | | 400 | — | — | — | 2750 | 1 | 15.60 | 0.57 |
| 44 | Yes | 5 | Ni18P | | 400 | Nitridation | 1% N2—Ar | 12 | 4350 | 1.13 | 14.24 | 0.26 |
| 45 | Yes | 5 | Ni18P | | 400 | Nitridation | 5% N2—Ar | 12 | 4450 | 1.17 | 14.09 | 0.22 |
| 46 | Yes | 5 | Ni18P | | 400 | Nitridation | 10% N2—Ar | 12 | 4600 | 1.24 | 13.85 | 0.15 |
| 47 | Yes | 5 | Ni18P | | 400 | Nitridation | 20% N2—Ar | 12 | 4800 | 1.24 | 13.71 | 0.12 |
| 48 | Yes | 5 | Ni18P | | 400 | Nitridation | 50% N2—Ar | 12 | 4750 | 1.23 | 13.76 | 0.13 |
| 49 | Yes | 5 | Ni18P | | 400 | Nitridation | 100% N2 | 12 | 4800 | 1.23 | 13.73 | 0.13 |
| 50 | Yes | 2 | Ni18P | | 400 | Nitridation | 10% N2—Ar | 12 | 4300 | 1.1 | 14.33 | 0.29 |
| 51 | Yes | 3 | Ni18P | | 400 | Nitridation | 10% N2—Ar | 12 | 4500 | 1.17 | 14.06 | 0.21 |
| 52 | Yes | 10 | Ni18P | | 400 | Nitridation | 10% N2—Ar | 12 | 4700 | 1.29 | 13.68 | 0.10 |
| 53 | Yes | 5 | Ni18P | | 400 | Nitridation | 50% Air-Ar | 12 | 4700 | 1.23 | 13.80 | 0.14 |

TABLE 6

| | | Non-metallic substrate | Orientation-determining film | | Type of film formation gas | | Coercive force (Oe) | Magnetic anisotropy | PW50 (ns) | Thermal stability (%/decade) |
|---|---|---|---|---|---|---|---|---|---|---|
| Test Ex. | Texturing | Surface roughness Ra (Å) | Material (at %) | Thickness (Å) | Type of gas | Pressure (Pa) | | | | |
| 54 | Yes | 5 | Ni25P | 400 | Ar | 3 | 1800 | 1.00 | 17.76 | 0.85 |
| 55 | Yes | 5 | Ni25P | 10 | 10% O2—Ar | 3 | 2400 | 1.04 | 17.26 | 0.74 |
| 56 | Yes | 5 | Ni25P | 20 | 10% O2—Ar | 3 | 2900 | 1.10 | 16.80 | 0.63 |
| 57 | Yes | 5 | Ni25P | 100 | 10% O2—Ar | 3 | 2950 | 1.17 | 16.63 | 0.57 |
| 58 | Yes | 5 | Ni25P | 400 | 10% O2—Ar | 3 | 3250 | 1.25 | 16.26 | 0.48 |
| 59 | Yes | 5 | Ni25P | 800 | 10% O2—Ar | 3 | 3300 | 1.24 | 16.24 | 0.48 |
| 60 | Yes | 5 | Ni25P | 1200 | 10% O2—Ar | 3 | Not evaluated due to film exfoliation | | | |
| 61 | Yes | 5 | Ni25P | 400 | 5% N2—Ar | 12 | 3250 | 1.23 | 16.30 | 0.49 |
| 62 | Yes | 5 | Ni25P | 400 | 20% N2—Ar | 8 | 3200 | 1.23 | 16.33 | 0.50 |
| 63 | Yes | 5 | Ni25P | 400 | 50% N2—Ar | 5 | 3250 | 1.23 | 16.30 | 0.49 |
| 64 | Yes | 5 | Ni25P | 400 | 80% N2—Ar | 2 | 3250 | 1.23 | 16.30 | 0.49 |

As is apparent from Table 1, the magnetic recording media of Test Examples 1 through 4 and Test Example 7, which were produced by the procedure in which the substrate 1 was subjected to texturing and the orientation-determining film 2 was subjected to oxidation, exhibit excellent magnetic anisotropy compared with the magnetic recording media of Test Examples of 8 and 9, which were produced by the procedure in which the substrate 1 was not subjected to texturing and the orientation-determining film 2 was not subjected to surface treatment.

The results also reveal that the magnetic recording medium of Test Example 5, which was produced by the procedure in which nitridation was carried out instead of oxidation, and the magnetic recording medium of Test Example 6, which was produced by the procedure in which a nitrogen-containing sputtering gas was employed, exhibit excellent magnetic anisotropy.

The results further reveal that the magnetic recording media of Test Examples 1 through 7 exhibit excellent thermal stability and have high coercive force. In addition, these media exhibit excellent resolution of reproduction output; i.e., these media exhibit small half power width of output peak (PW50).

The results shown in Table 2 reveal that, when the content of P in NiP is 40 at % or less, magnetic anisotropy is high, and PW and thermal stability are improved.

The results shown in Table 3 reveal that, when the oxygen content of the oxygen-containing gas employed for surface oxidation is at least 1 vol %, satisfactory effects are obtained; and that, when the pressure is at least 2 Pa, satisfactory effects are obtained, whereas characteristics of the magnetic recording medium are impaired to some extent when the pressure is low.

The results shown in Table 4 reveal that, instead of oxygen-containing argon gas, air or steam can be employed for oxidation; and that, even when a tempered-glass substrate or an alumina-sintered substrate is employed, satisfactory effects are obtained.

The results shown in Table 5 reveal that, even when the orientation-determining film is subjected to nitridation, satisfactory effects are obtained; and that, when air is employed, the film is subjected to nitridation and oxidation, but oxidation is assumed to occur prior to nitridation.

The results shown in Table 6 reveal that, even when an oxygen- or nitrogen-containing gas is employed as a sputtering gas (film formation gas), satisfactory effects are obtained.

As described above, according to the production process for a magnetic recording medium of the present invention, an orientation-determining film is formed on a non-metallic substrate which has undergone texturing, and the orientation-determining film is subjected to oxidation or nitridation. Therefore, even when the non-metallic substrate, which encounters difficulty in imparting magnetic anisotrophy to a magnetic film, is employed, the crystalline orientation of a non-magnetic undercoat film and the magnetic film formed over the substrate, can be improved. In addition, the magnetic anisotropy of the magnetic film can be enhanced. Therefore, magnetic characteristics of the resultant magnetic recording medium, such as thermal stability, can be improved.

Furthermore, in a film formation apparatus, the orientation-determining film is formed on the non-metallic substrate, which has undergone texturing, and subsequently, the non-magnetic undercoat film 3 and the magnetic film 4 are formed on the orientation-determining film 2 in the same apparatus. Therefore, the production process can be simplified, and production costs can be reduced.

The magnetic recording medium of the present invention includes a non-metallic substrate that has undergone texturing, an orientation-determining film formed on the substrate, and a non-magnetic undercoat film and a magnetic film, which are formed on the orientation-determining film; and the ratio of a coercive force in a circumferential direction of the medium (Hcc) to a coercive force in a radial direction of the medium (Hcr); i.e., Hcc/Hcr, is 1.1 or more. Therefore, the magnetic recording medium of the present invention exhibits high magnetic anisotropy and excellent magnetic characteristics, such as thermal stability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-metallic substrate having a surface which has texture lines; an orientation-determining film which determines the crystal orientation of a film provided directly on the orientation-determining film, formed on the non-metallic substrate, wherein at least the surface of the orientation-determining film is oxidized or nitridized; and a non magnetic undercoat film and a magnetic film formed on the orientation-determining film, wherein the ratio of a coercive force in a circumferential direction of the medium (Hcc) to a coercive force in a radial direction of the medium (Hcr), Hcc/Hcr, is 1.1 or more.

2. A magnetic recording medium according to claim 1, wherein the surface of the orientation-determining film is oxidized.

3. A magnetic recording medium according to claim 1, wherein the surface of the orientation-determining film is nitridized.

4. A magnetic recording medium according to any one of claims 1 through 3, wherein the orientation-determining film comprises NiP, in which the content of P is 10–40 at %, as a primary component.

5. A magnetic recording medium according to any one of claims 1 through 3, wherein the orientation-determining film comprises NiPX, wherein X is one or more species of Cr, Mo, Si, Mn W, Nb, Ti, and Zr, and the content of X is 0–25 at %, as a primary component.

6. A magnetic recording medium according to any one of claims 1 through 3, wherein the orientation-determining film has thickness of 2–100 nm.

7. A magnetic recording medium according to any one of claims 1 through 3, wherein the orientation-determining film has an average surface roughness (Ra) of less than 0.5 nm.

8. A magnetic recording medium according to any one of claims 1 through 3, wherein the non-metallic substrate is a glass substrate.

9. A magnetic recording medium according to any one of claims 1 through 3, wherein a non-magnetic adhesive film which prevents exfoliation of the orientation-determining film from the substrate is between the non-metallic substrate and the orientation-determining film, and the non-magnetic adhesive film comprises one or more species selected form the group consisting of Cr, Mo, Nb, C, Re, Zr, W, and Ti.

10. A magnetic recording and reproducing apparatus comprising a magnetic recording medium as recited in any one of the claims 1 through 3, and a magnetic head for recording data onto the medium and reproducing the data therefrom.

* * * * *